(12) United States Patent
Tashev (10) Patent No.: US 7,394,907 B2
(45) Date of Patent: Jul. 1, 2008

(54) SYSTEM AND PROCESS FOR SOUND SOURCE LOCALIZATION USING MICROPHONE ARRAY BEAMSTEERING

(75) Inventor: Ivan Tashev, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1053 days.

(21) Appl. No.: 10/462,324

(22) Filed: Jun. 16, 2003

(65) Prior Publication Data

US 2004/0252845 A1    Dec. 16, 2004

(51) Int. Cl.
*H04R 3/00* (2006.01)
(52) U.S. Cl. ............................. 381/92; 381/122; 381/56
(58) Field of Classification Search .................. 381/92, 381/91, 56, 122; 348/14.01, 14.08; 379/202.01, 379/206.01
See application file for complete search history.

(56) References Cited

U.S. PATENT DOCUMENTS 5,335,011 A * 8/1994 Addeo et al. ............... 348/14.1
5,581,620 A * 12/1996 Brandstein et al. ............ 381/92
6,098,040 A * 8/2000 Petroni et al. ................ 704/234
6,243,471 B1 * 6/2001 Brandstein et al. ............ 381/92
7,092,882 B2 * 8/2006 Arrowood et al. ........... 704/233

OTHER PUBLICATIONS

Duraiswami, R., D. Zotkin, and L. Davis, Active speech source localization by a dual coarse-to-fine search, *Proceedings ICASSP* 2001, Salt Lake City, UT, May 2001.
Ward, D., and R. Williamson, Particle filter beamforming for acoustic source localization in a reverberant environment, *ICASSP* 2002, Orlando, Fl, May 2002.

* cited by examiner

*Primary Examiner*—Vivian Chin
*Assistant Examiner*—Con P Tran
(74) *Attorney, Agent, or Firm*—Lyon & Harr, LLP; Richard T. Lyon (57) ABSTRACT

A system and process for sound source localization (SSL) utilizing beamsteering is presented. The present invention provides for improved beamsteering with less drain on system resources while providing accurate, real time results. To accomplish this, the present SSL system and process rejects as much as possible extraneous audio frames and analyzes only those frames exhibiting a well defined sound source. In addition, the number of beams is reduced as much as possible to save on processing time, but a full scan of the working volume is still made with the beams. And finally, interpolation is used to increase the precision of the technique.

21 Claims, 6 Drawing Sheets

SYSTEM AND PROCESS FOR SOUND SOURCE LOCALIZATION USING MICROPHONE ARRAY BEAMSTEERING

BACKGROUND

1. Technical Field

The invention is related to finding the direction to a sound source from a microphone array in a prescribed search area using a beamsteering approach, and more particularly to such a system and process that provides improved beamsteering with less drain on system resources while providing accurate, real time results.

2. Background Art

Localization of sound sources plays important role in many audio systems having microphone arrays. Different techniques have been developed to perform this sound source localization (SSL). In general, these techniques fall into two categories—namely those based on time delay estimates (TDE), and those based on beamsteering. Finding the direction to a sound source plays an important role in doing spatial filtering, i.e. pointing a beam to the sound source and suppressing the noises coming from other directions. In some cases the direction to the sound source is used for speaker tracking and post processing of recorded audio signals. In the context of a videoconferencing system, speaker tracking is often used to direct a video camera toward the person speaking.

In general, a majority of sound source localization systems process the signals from the microphone array as follows. First, each signal from each microphone of the array is pre-processed. This includes packaging the signal in frames, performing noise suppression and performing a classification that decides whether a frame will be processed or rejected for the purposes of determining the location of a sound source. In addition, a frame may be converted into the frequency domain depending on the type of analysis that is to be performed. Once the preprocessing is complete, the actual sound source localization typically involves using one of the aforementioned techniques—namely time delay estimation or beamsteering. This stage ends with direction estimation or the generation of a probability distribution function (PDF), each of which indicated where a sound source is located. This location can be defined in terms of one angle (localization in one dimension), two angles (direction and elevation—localization in 2D) or a full 3D localization (i.e., direction, elevation and distance). The major problems the various existing SSL approaches try to solve are robustness to reverberation, the ability to distinguish multiple sound sources, and high precision in an noisy environment. Once an indicator of the sound source location has been computed, a post-processing phase can be implemented. Essentially, in post processing, the results of several localization measurements are combined to increase the precision, to follow the sound source movements, or to track multiple sound sources. Techniques used for this vary from simple averaging to more complicated statistical processing, Kalman filtering, particle filtering [2], and the like.

In regard to the group of SSL processes based on TDE techniques, the processing generally involves analyzing the signals coming from pairs of microphones in the array. One M element microphone array can have up to $M(M-1)/2$ different pairs. The processes usually find the direction to the sound source in two phases. During the first phase, the delays are calculated for each microphone pair based on correlation function estimation, with modifications for better robustness to reverberated waves and noise. In the second phase, all time delay estimates are combined to compute the final direction to the sound source. Besides increasing the precision and robustness to reverberation and noises, the second phase has to resolve a degree of ambiguity introduced by the TDE method itself. More particularly, for each microphone pair, there are many directions with the same time delay in the working volume (i.e., it is a hyperbolic surface). To overcome this major disadvantage, the microphone arrays associated with sound source localizers based on TDE are positioned in certain ways that result in the work volume being in just one half of the space. Another disadvantage of this group of methods is that the amount of necessary calculations increases with the square of the number of microphones in the array.

The beamsteering approach, on the other hand, is based on well known techniques used to capture sound with microphone arrays—namely beamforming. This is the ability to make the microphone array "listen" to a given direction and to suppress the sounds coming from other directions. Processes for sound source localization with beamsteering form a searching beam and scan the work space by moving the direction the searching beam points to. The energy of the signal, coming from each direction, is calculated. The decision as to what direction the sound source resides is based on the maximal energy. This approach leads to finding extremum of a surface in the coordinate system direction, elevation, and energy. In most of the cases this surface is multimodal, i.e. it has multiple extremums due to multiple sound sources and reverberated waves. Additional difficulties are caused by the shape of the searching beam. For different frequencies, the easiest beamforming process, i.e., the delay and sum technique, introduces so-called side lobes. These are directions with increased sensitivity. Also critical for quick localization is the searching procedure. Examples of existing search procedures are the coarse-to-fine search described in reference [1] and the tracking of the sound source using particle filters technique described in reference [2]. The main advantages of the beamsteering approach to SSL are that it does not introduce ambiguity as is the case with the TDE approach. In addition, beamsteering uses the signals from all microphones for energy estimation for each direction, which leads to better robustness to noise and reverberations.

However, SSL computations based on beamsteering are generally considered slower, less precise, but more robust to reverberation and noise than SSL computations based on TDE. The present invention resolves the shortcomings of the beamsteering approach to provide accurate and real time SSL computations, while still retaining the robustness such techniques are known for.

It is noted that in the preceding paragraphs the description refers to various individual publications identified by a numeric designator contained within a pair of brackets. For example, such a reference may be identified by reciting, "reference [1]" or simply "[1]". A listing of references including the publications corresponding to each designator can be found at the end of the Detailed Description section.

SUMMARY

The present invention is directed toward a system and process for finding the direction to a sound source from a microphone array in a pre-defined search area using a novel beamsteering approach. Generally, this is accomplished by first determining the minimum number of beams it will take to cover the entire search area without significant overlap. Once the number of beams is known, a plurality of search directions upon which the beams are centered and which extend away from the microphone array are established. These search directions equal the minimum number of beams and are spaced equally from each other in such a way as to cover the entire search area while preventing any substantial overlap between adjacent beams. Next, the audio energy of the signal within the beams associated with each of the set of search directions is computed using the signals produced by the microphones of the array. The search direction exhibiting the maximum energy is then identified and the maximum energy direction is designated as the direction to the sound source. The foregoing technique is typically performed on a frame-by-frame basis, with the goal of eliminating any frame that is deemed to lack evidence of a significant sound source related to the type of sound being sought. This contributes to the speed of the technique. It is also noted that using beams having a smooth shape will reduce the number needed and so further speed up the process.

The foregoing general procedure to find the direction to a sound source can be implemented in one embodiment as follows. First, the microphone signals under consideration are segmented into frames and the frames representing the earliest captured frame of each microphone signal which has not been previously processed, are selected. The selected frames are then subjected to a standard noise suppression procedure to minimize the effects of ambient noise. The frames are also classified as to whether they exhibit evidence of a significant sound source. When they do not, the frames are eliminated from consideration and the process to this point is repeated using a newly selected set of frames. If, however, it is found that the frames do exhibit evidence of a significant sound source, then the full spectrum energy for a beam in each of the aforementioned search directions is computed. A significant sound source is deemed to exist in the frames if the overall energy of each frame exceeds a prescribed multiple of the noise floor associated with the frames.

The full spectrum energy of a beam is defined as $$E_{est}(d_l) = \int_0^{\frac{f_s}{2}} E_{est}(d_l, f) S(f) df,$$

wherein $f_s$ is the sampling frequency, $d_l$ is a search direction and $S(f)$ is a weight function. The weight function reflects the estimated spectrum of sound coming from the sound source that it is desired to find the direction to from the microphone array. For example, if the sound source is a human voice, a graph of the weighting factor, which ranges in fractions between 0 and 1, against the frequency of the sound, represents a bell shaped curve with a maximum at about 1000 Hz and limits at about 500 and 1500 Hz. More particularly, the weighting factor $S(f)$ is defined as $$S(f) = \begin{cases} 0.5 + 0.5\cos\left(\frac{2\pi(f - 1000)}{1000}\right) & \text{for } f \text{ between about 500 and 1500 Hz} \\ 0 & \text{otherwise} \end{cases}.$$

Once the full spectrum energy for a beam in each of the aforementioned search directions is computed, the search direction exhibiting the maximum energy is identified for the selected frames. In one embodiment of the present system and process this entails first eliminating any frame set where the energy differences are not significant. More, particularly, the greatest and smallest weighted energy values computed for the beams are identified, and it is determined if there is at least a prescribed minimum energy difference between them. If not, the frame set is eliminated from consideration and the process repeats with a newly selected frame set. If the minimum energy difference does exist, then the search direction having the maximum energy is designated as being the search direction associated with the greatest weighted energy. A minimum energy difference is not present if an energy ratio is less than a prescribed constant representing the minimum allowed energy difference (e.g., 0.3). The energy ratio is the difference between the greatest and smallest weighted energy values, divided by the average weighted energy. If the energy ratio equals or exceeds the aforementioned constant, then the desired minimum energy difference is present.

Once the search direction exhibiting the maximum energy is identified, a maximum energy direction is designated that represents the direction to the sound source. While the use of smooth beam shapes minimizes the processing requirements of the search process, the beam exhibiting the maximum energy can only pinpoint the location of the sound source to the search direction associated the beam itself, which can be a considerable area. However, the location of the sound source can be refined by examining the neighboring beams. More particularly, the maximum energy direction can be found by interpolating between the search direction exhibiting the maximum energy and two or more adjacent search directions to refine the direction from the microphone array that represents the sound source direction. This interpolation is accomplished by first characterizing the search direction exhibiting the maximum energy and two or more adjacent search directions as an approximation surface which can be defined as a polynomial having an order equal to the number of neighboring search directions, such that for each search direction considered, the energy associated with that direction is set equal to a set of the same unknown coefficients and that direction, in polynomial form, thereby creating a linear system of equations equaling the number of unknown coefficients. The linear system of equations is then solved to determine the unknown coefficients. The maximum of the approximation surface is then computed as the zero of the first derivative of the polynomial equation characterizing the approximation surface. The direction associated with the estimated approximation surface maximum is designated as the sound source direction.

Post processing techniques can be used to refine the sound source direction derived via the foregoing system and process. For example, the sound source directions computed over a series of frame sets can be combined to produce a refined estimate. Any conventional method of combining the direction estimates can be used. For example, averaging the sound source directions, subjecting the sound source directions to a Kalman filtering procedure, or subjecting the sound source directions to a particle filtering procedure would be appropriate choices.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
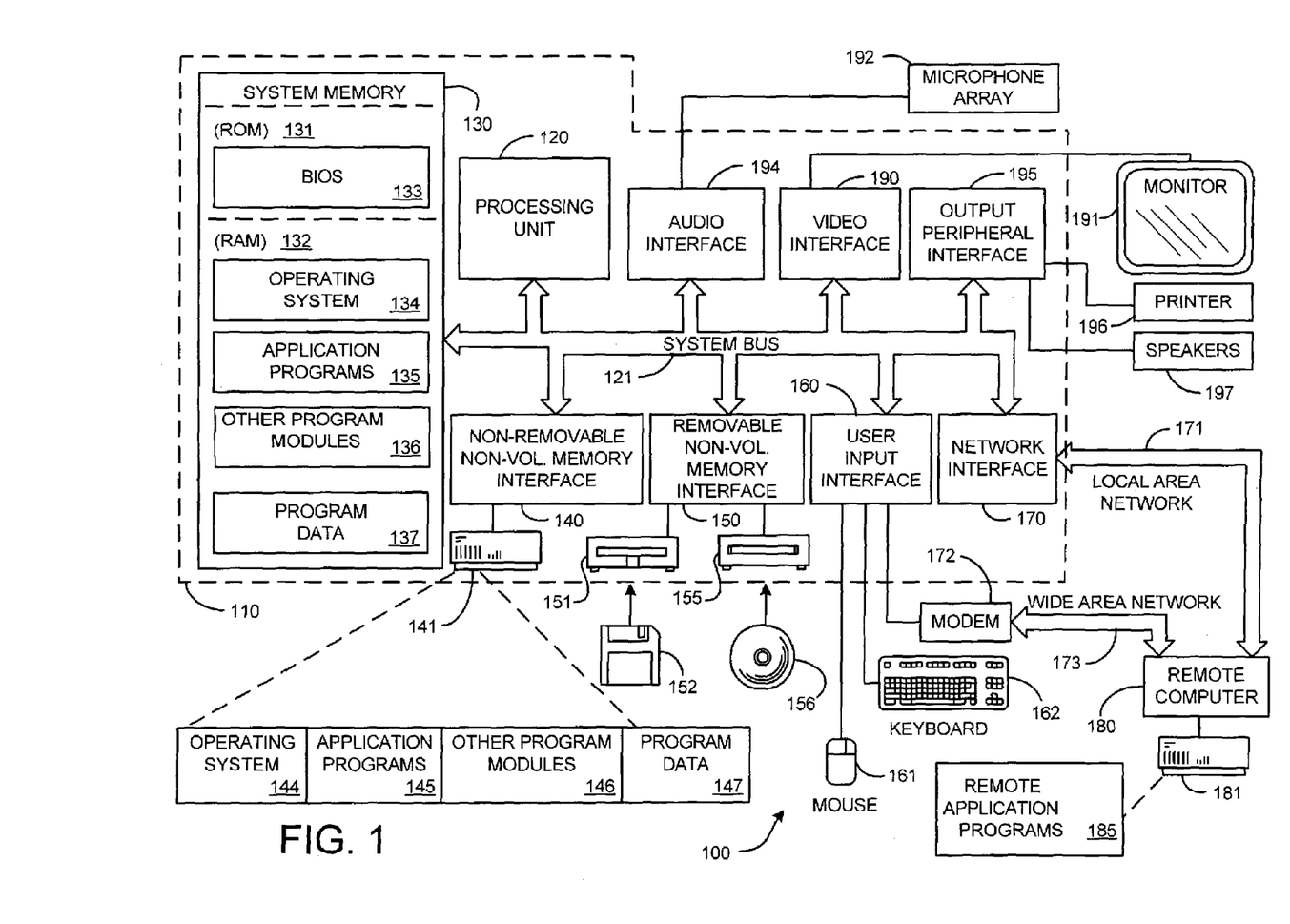
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a microphone array 192, and/or a number of individual microphones (not shown) are included as input devices to the personal computer 110. The signals from the microphone array 192 (and/or individual microphones if any) are input into the computer 110 via an appropriate audio interface 194. This interface 194 is connected to the system bus 121, thereby allowing the signals to be routed to and stored in the RAM 132, or one of the other data storage devices associated with the computer 110.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 Accurate and Real Time Beamsteering SSL

The exemplary operating environment having now been discussed, the remaining part of this description section will be devoted to a description of the program modules embodying the invention. Generally, the system and process according to the present invention provides an accurate, real time SSL implementation that is based on beamsteering. To accomplish this, the present SSL system and process rejects as much as possible extraneous audio frames and analyzes only those frames exhibiting a well defined sound source. In addition, the number of beams is reduced as much as possible to save on processing time, but a full scan of the working volume is still made with the beams. And finally, interpolation is used to increase the precision of the technique.

The present SSL system and process is also able to detect the direction to sound sources in a full 360 degree work zone, or any portion of interest thereof. As such it is well suited for integration into the audio portion of a teleconferencing system. However, the technique is not limited to just a video conferencing application. Rather it can be employed to any audio system where it is necessary to do SSL, and especially to those requiring SSL within a full 360 degree work zone.

Figure 2:
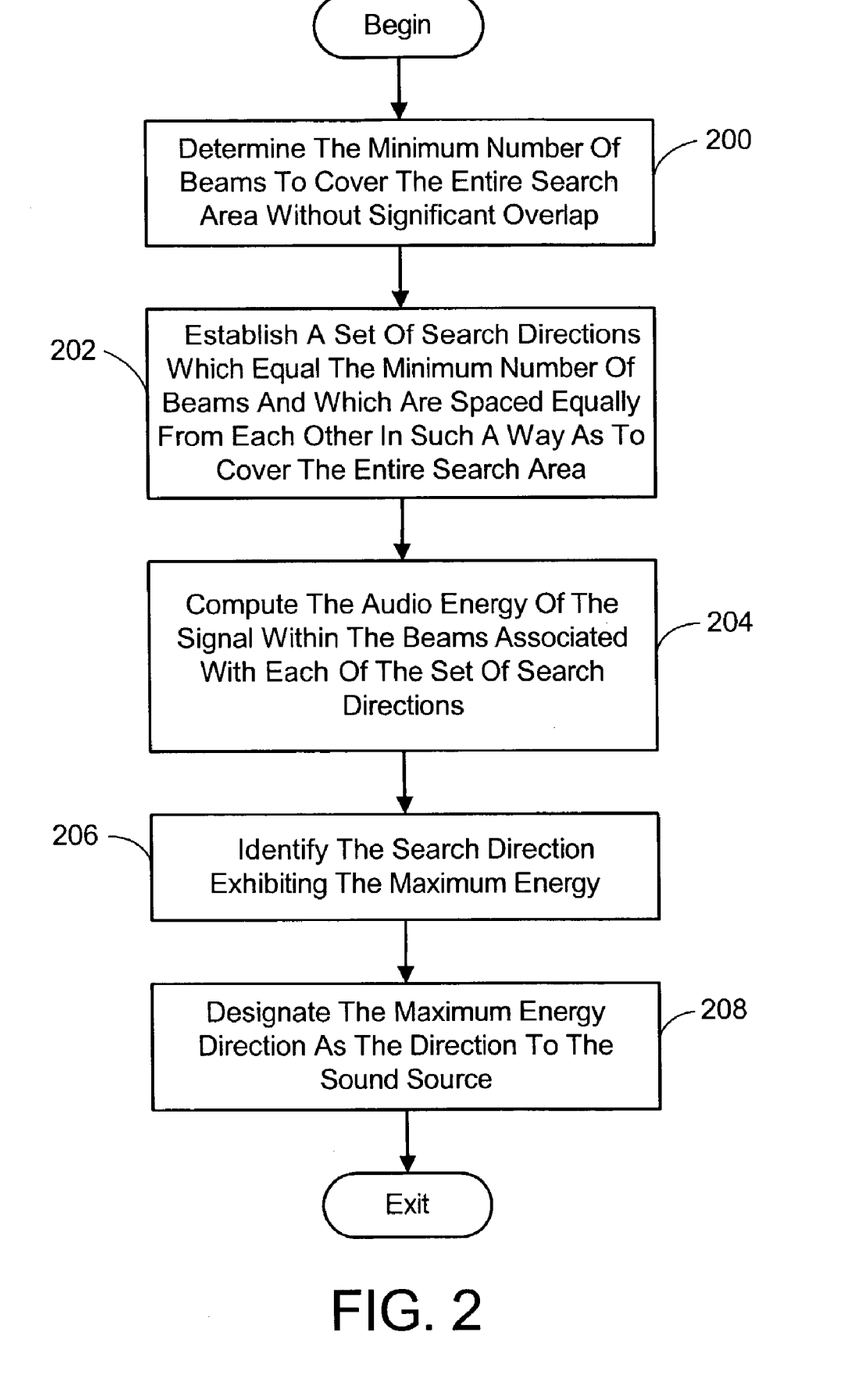
FIG. 2 is a flow chart diagramming an overall process for finding the direction to a sound source from a microphone array in a prescribed search area using a beamsteering approach according to the present invention.

In general, the present SSL process is accomplished by finding the direction to a sound source from a microphone array in a prescribed search area using a beamsteering approach via the following process actions, as shown in the high-level flow diagram of FIG. 2:

a) determining the minimum number of beams it would take to cover the entire search area without significant overlap (process action 200);

b) establishing a set of search directions extending away from the microphone array which equal the minimum number of beams and which are spaced equally from each other in such a way as to cover the entire search area while preventing any substantial overlap between adjacent beams extending along those directions (process action 202);

c) computing the audio energy within the beams associated with each of the set of search directions (process action 204);

d) identifying the search direction exhibiting the maximum energy (process action 206); and e) designating the maximum energy direction as the direction to the sound source (process action 208).

2.1 Minimizing the Number of Beams and Establishing the Search Directions

Assume there is an M element microphone array with known positions for each of the microphones. The output signal of the microphone array in the frequency domain can be characterized as:

$$Y_d(f) = \sum_{m=0}^{M-1} W_m^d(f) X_m(f) \quad (1)$$

where $X_m(f)$ is the spectrum of the input signal from $m^{th}$ microphone, $W_m^d(f)$ is the weight function providing directivity in direction $d=\{\phi,\theta\}$ (yaw and pitch) and $Y_d(f)$ is the spectrum of the output signal. Each weight matrix provides the directivity of the microphone array $b_{d_l}(d,f)$. This is the gain of the microphone array with the beam pointing at direction $d_l$ when the signal with frequency f comes from direction $d=\{\phi,\theta\}$. The weighting function needed to achieve a given shape of the beam pointing to direction d is computed via any appropriate conventional means. For example, for a conventional "delay and sum" process, the weight function is computed as:

$$W_m^d(f) = e^{-j\frac{2\pi f l_m}{c}}, \quad (2)$$

where $l_m = p_m \cos(\phi - \phi_m)\cos(\theta - \theta_m)$ and $(p_m, \phi_m, \theta_m)$ are the micro a radial coordinate system and c is the speed of the sound. Other beam shapes could be formed using other known weighting functions.

The spatial sound distribution model employed in the present invention includes ambient noise with spectrum $A_0(f)$ and K point sound sources with spectrums $A_k(f)$ at directions $d_k$. This represents one or more actual sound sources plus reverberated waves. In this case the energy distribution in the space is:

$$\tilde{E}(d, f) = A_0(f) + \sum_{k=1}^{K} \delta_{d_k}(d) A_k(f), \quad (3)$$

where $\delta_{d_k}(d)$ denotes unit energy Dirac pulse at d, i.e., $$\delta_{d_k}(d) = \begin{cases} 1 & \text{for } d = d_k \\ 0 & \text{for } d \neq d_k \end{cases}. \quad (4)$$

Figure 3:
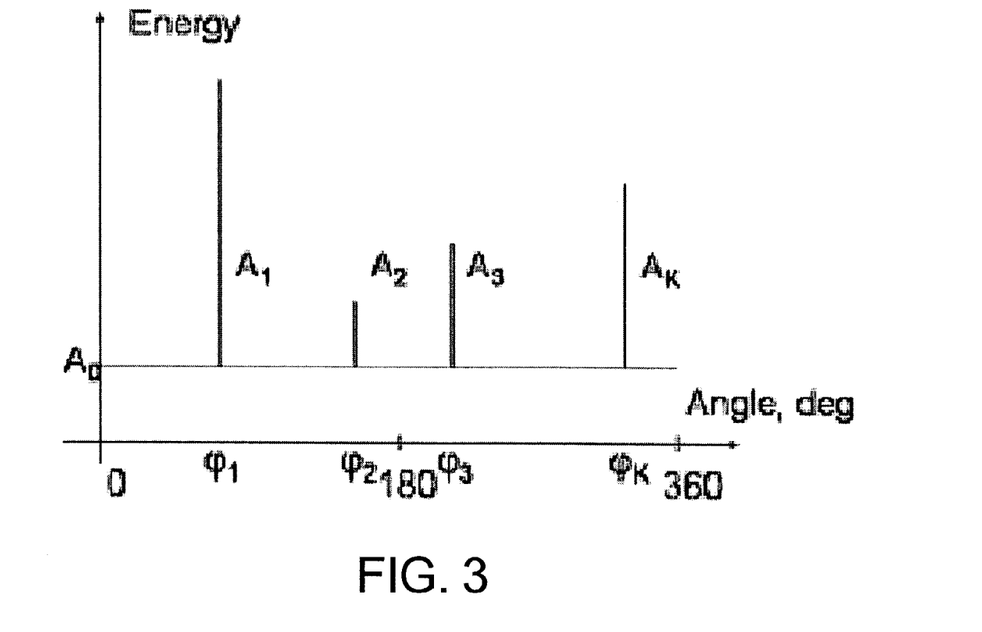
FIG. 3 is an idealized energy distribution graph plotting energy against the angle in degrees around the microphone array for one frequency.

An example plot of the energy distribution for one dimension (yaw angle) and one frequency is shown in FIG. 3.

Now assume that the energy from L evenly distributed beams in the working space is computed, $4\pi$ steradians for the full sphere and $E(d_l,f)$, $l=0 \ldots (L-1)$. A discretization procedure is performed in L points of the function that reflects the distribution of the energy in the different directions convoluted with the shape of the probe (i.e., the beam):

$$E(d_l,f) = \tilde{E}(d,f) * b_{d_l}(d,f) \quad (5)$$

The Fourier transformation of the energy distribution is in an energy-direction frequency space with dimensions Joules (energy) and steradians$^{-1}$:

$$\hat{E}(D_l,f) = TF[\tilde{E}(d,f)] B_{D_l}(D,f), \quad (6)$$

where TF[ ] denotes Fourier transformation and B(D,f) denotes the Fourier transformation of the shape of probing beam for frequency f. The spectrum of energy distribution in the energy-direction space $D=\{\alpha,\beta\}$ is as follows:

$$\hat{E}(D_l, f) = \left( \frac{1}{4\pi} A_0(f) \delta_0(D) + \frac{1}{4\pi} \sum_{k=1}^{K} A_k(f) e^{-jD_k} \right) B_{D_l}(D, f) \quad (7)$$

where $e^{-jD_k}$ denotes the phase shift in the D space. For each audio frequency bin the number of sampling points should meet the requirements of the generalized sampling theorem, i.e.:

$$L \geq 2 \frac{4\pi}{\alpha_{max} \beta_{max}}, \quad (8)$$

where $\alpha_{max}$ and $\beta_{max}$ are such that for $\alpha > \alpha_{max}$ and $\beta > \beta_{max}$, $\hat{E}(D,f)=0$. Thus, the number of beams needed to cover the entire spherical search space without significant overlap can be determined by first computing $\alpha_{max}$ and $\beta_{max}$ using Eq. (7), and then computing L (i.e., the minimum number of equally spaced beams required to cover the spherical space) using Eq. (8).

It is noted that while a Fourier transformation was employed in the derivation above, other frequency transforms could be used instead, such as a modulated complex lapped transform (MLCT).

Once the number of beams is known, a set of directions is established such that each is spaced equidistant from its adjacent directions and the total number is equal to L. Simulations with real microphone arrays and "delay and sum" beams showed that the number of required beams is not so large. This is due to the fact that the shape of the beam for the delay and sum beamformer is wide and smooth, and so covers a relatively large area. The whole sphere ($4\pi$ steradians) can be covered using ~200 equidistant points or directions (i.e., "delay & sum" beams pointed in 200 different but equidistant directions). In other words, the entire spherical search area around the microphone array can be screened for the location of a sound source while still minimizing the number of directions analyzed by directing the beams such that there is little or no overlap but also no significant gaps in the area searched. The number of beams employed can be reduced even further under some circumstances. For example, in case of planar microphone array the number is two times less (i.e., have to cover one hemisphere only) and for linear arrays (i.e., have to cover just a half circle) the number of points goes down to a very acceptable 8-32 depending on the shape of the beam. In addition, in case where the elevation angle of the sound source is not likely to vary significantly (such as in a teleconferencing situation) it can be fixed at some angle within the range of possible angles. This allows the number of points to be reduced to around 8-32 as well.

The number of beams required to cover the entire search area will vary depending on the shape of the beam. While the numbers described above apply to a standard "delay and sum" beam shape, other beam shapes may require more or fewer beams to cover the entire area. Thus, a narrow beam shape would require more directions to be checked. The point is that as few beams as possible are used while still covering all of the desired search area. This make the SSL process efficient in that processing time is minimized to the point that real-time SSL become feasible. This flies in the face of current conventional wisdom which believes beamsteering techniques are too slow and processor intensive to be practical for real time applications.

2.2 Computing the Energy of the Beams

From the energy distribution for different directions and frequencies, the energy can be calculated for each direction as:

$$E_{est}(d_l) = \int_0^{\frac{f_s}{2}} E_{est}(d_l, f) S(f) df, \quad (9)$$

where $f_s$ is the sampling frequency and $S(f)$ is a weight function (e.g., usually the estimated spectrum of the signal coming from the sound sources). In the case where the sound source being sought is a human voice, weight function $S(f)$ can be defined by:

$$S(f) = \begin{cases} 0.5 + 0.5\cos\left(\frac{2\pi(f-1000)}{1000}\right) & \text{for } f \text{ between about 500 and 1500 Hz} \\ 0 & \text{otherwise} \end{cases} \quad (10)$$

A graph of this function is a bell shaped curve with a maximum at about 1000 Hz and limits at about 500 and 1500 Hz. If the sound source is other than a human voice, other frequency limits and other weighting functions known to be more appropriate for the application would be employed instead.

3.0 Refining the Sound Source Direction

Figure 4:
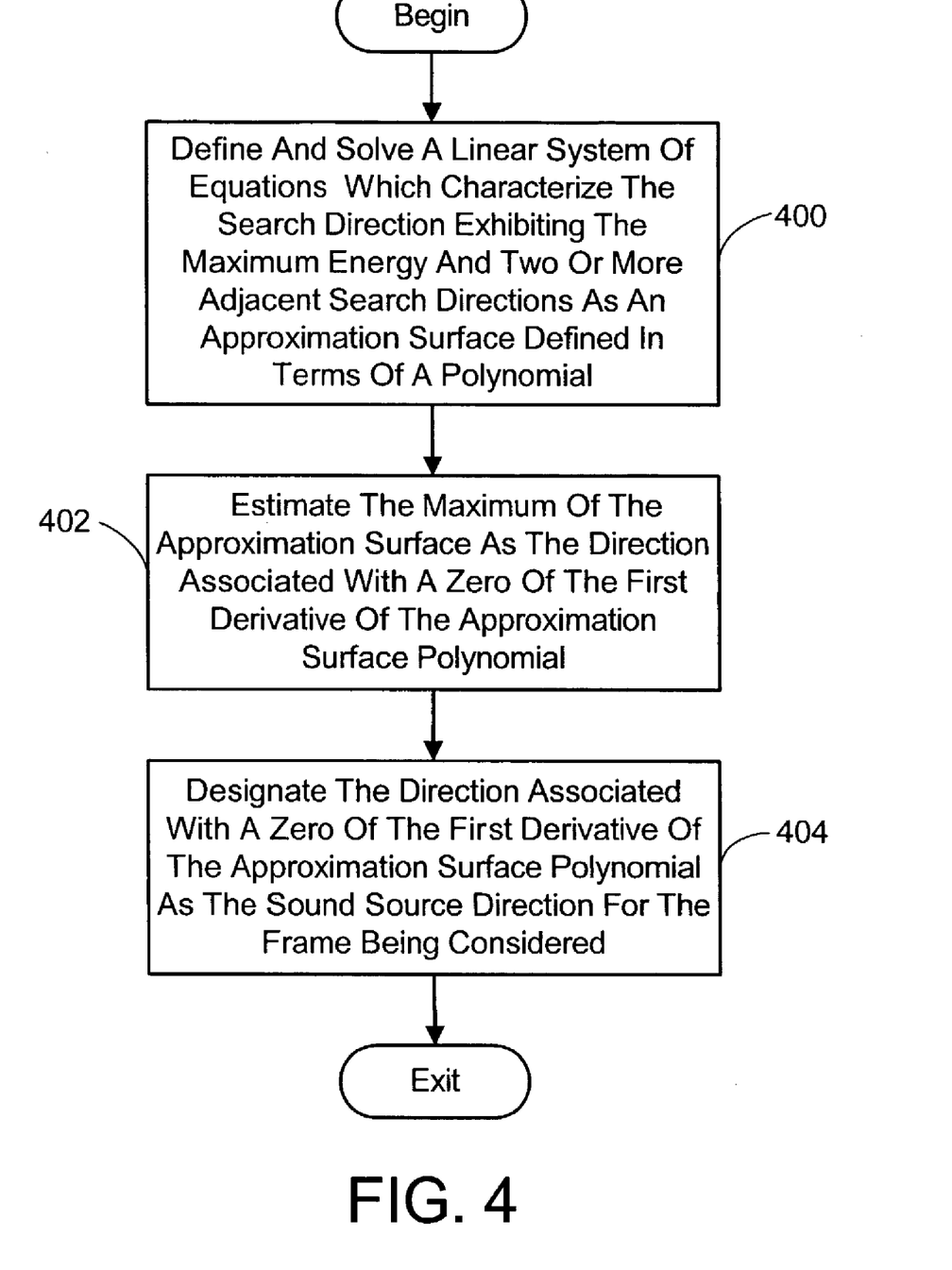
FIG. 4 is a flow chart diagramming a process for interpolating between the search direction exhibiting the maximum energy and two or more adjacent search directions to refine the direction from the microphone array that represents the sound source direction.

While the use of smooth beam shapes minimizes the processing requirements of the search process, the beam exhibiting the maximum energy can only pinpoint the location of the sound source to a direction within the beam itself, which can be a considerable area. However, the location of the sound source can be refined by examining the neighboring beams. More particularly, after measuring the energy in all L points, an approximation surface is generated from the maximum energy point and one or more of its neighboring points, and a more precise sound source location direction is computed. Referring to FIG. 4, this refining procedure is accomplished by first defining and solving a linear system of equations (process action 400), the number of which is equal to the necessary coefficients. In essence the approximation surface is represented as a polynomial having an order and number of unknowns dependent on the number of neighboring beams considered. For example, if the maximum energy beam and two of its neighboring beams is considered, the polynomial equation for a single dimension (e.g., yaw) would take the form of:

$$E(d_l) = a_2 d^2 + a_1 d + a_0 \quad (11)$$

where $a_2$, $a_1$ and $a_0$ are unknown coefficients and $d_l$ denotes the direction of the beam. As there are three beams, there would be three equations with three unknown coefficients. Thus, the unknown coefficients can be determined. Next, in process action 402, the estimated maximum of the approximation surface, which represents the estimated sound source direction for the frame under consideration, is found as the direction associate with a zero of the first derivative. Thus, $$\frac{\partial E}{\partial d} = 2a_2 d + a_1 = 0 \quad (12)$$

$$d_{ss} = \frac{-a_1}{2a_2}$$

where $d_{ss}$ is the refined direction of the sound source. Accordingly in process action 404, this direction is then designated as the sound source direction as derived from the signal frame set being considered.

4.0 Implementation

As indicated previously, the present SSL system and process is ideally suited for implementation in a teleconferencing system. The following is a description of one such implementation and is intended as an example only, not a limitation to the present system and process.

Figure 5:
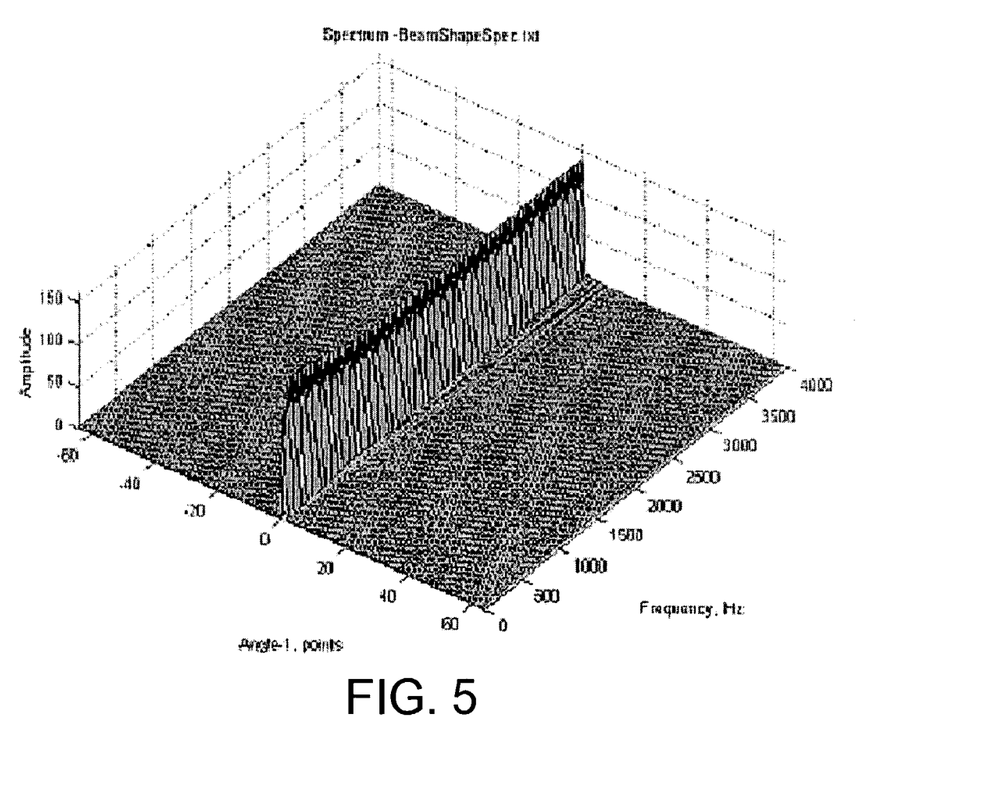
FIG. 5 is three dimensional graph illustrating the spectrum of a "delay and sum" beamformer.

In this example teleconferencing system implementation, the microphone array is positioned in the middle of the conference room table. It is a planar, eight element microphone array with equidistant audio sensors arranged in a circle having a diameter of about 14 centimeters. The audio portion of the system works with 20 ms frames and 16000 Hz sampling rate and the audio processing is done entirely in frequency domain. In this particular case only the yaw angle to the sound source needed, as the pitch can be assumed to remain approximately the same. Namely, for a person sitting about 1 m from the microphone array the pitch is approximately 30 degrees, and if the person is 2.5 meters away, the pitch is approximately 11 degrees. Therefore, a constant pitch of θ=15° is an acceptable choice for the fixed pitch angle of the search beams. In this way, the search dimensions are reduced to just one—namely the yaw angle in degrees from an arbitrary zero direction from the center of the microphone array. A simple "delay and sum" beamformer is employed in this example. The spectrum of the beam shape of this type of beamformer, as shown in FIG. 5, has no predominantly large harmonics. This allows the number of sampling beams to be reduced to about 32 without violation of the sampling theorem.

Figure 6A:
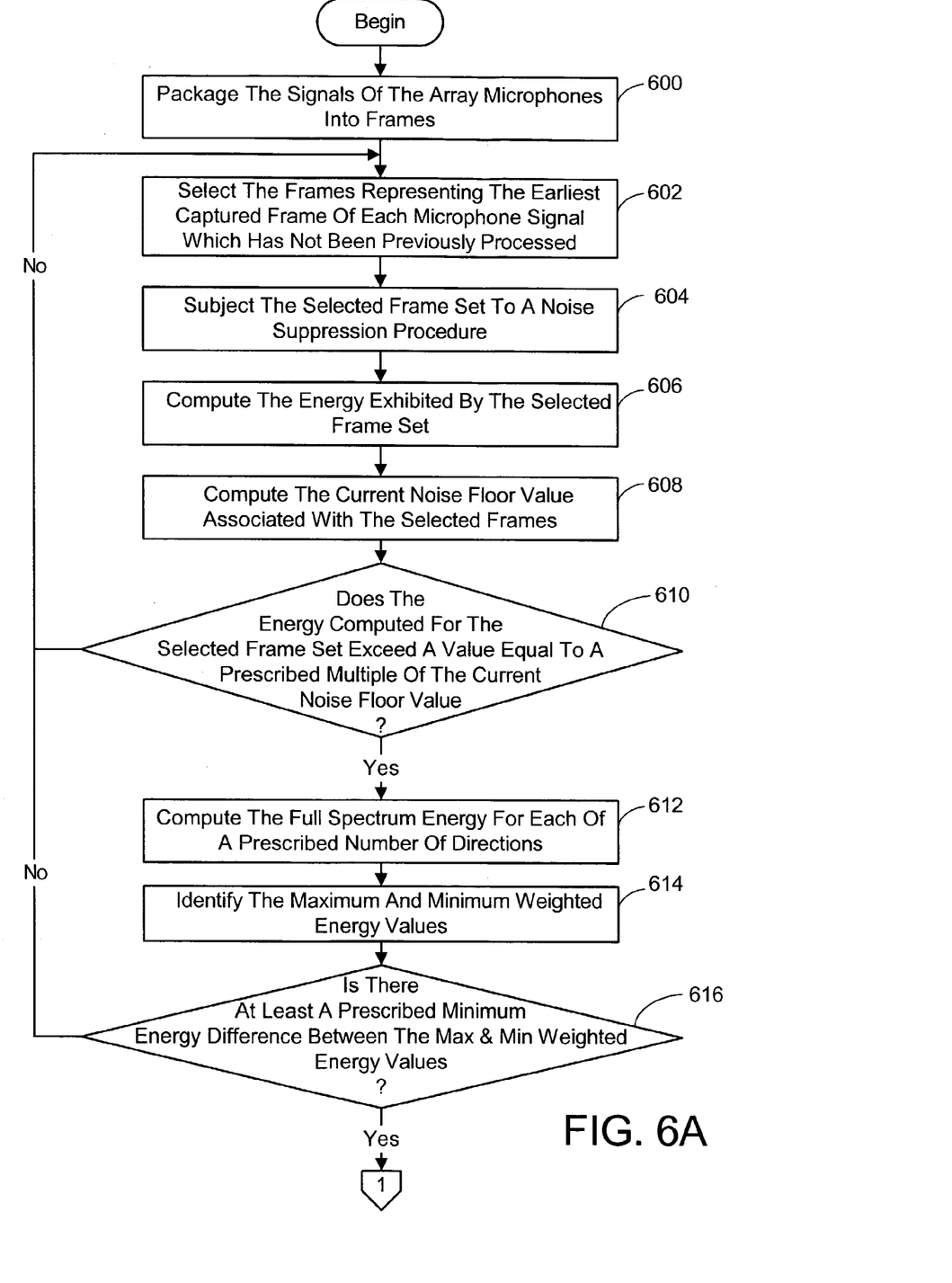
FIGS. 6A and B are a flow chart diagramming an implementation of the process for finding the direction to a sound source according to overall process of FIG. 2.
Figure 6B:
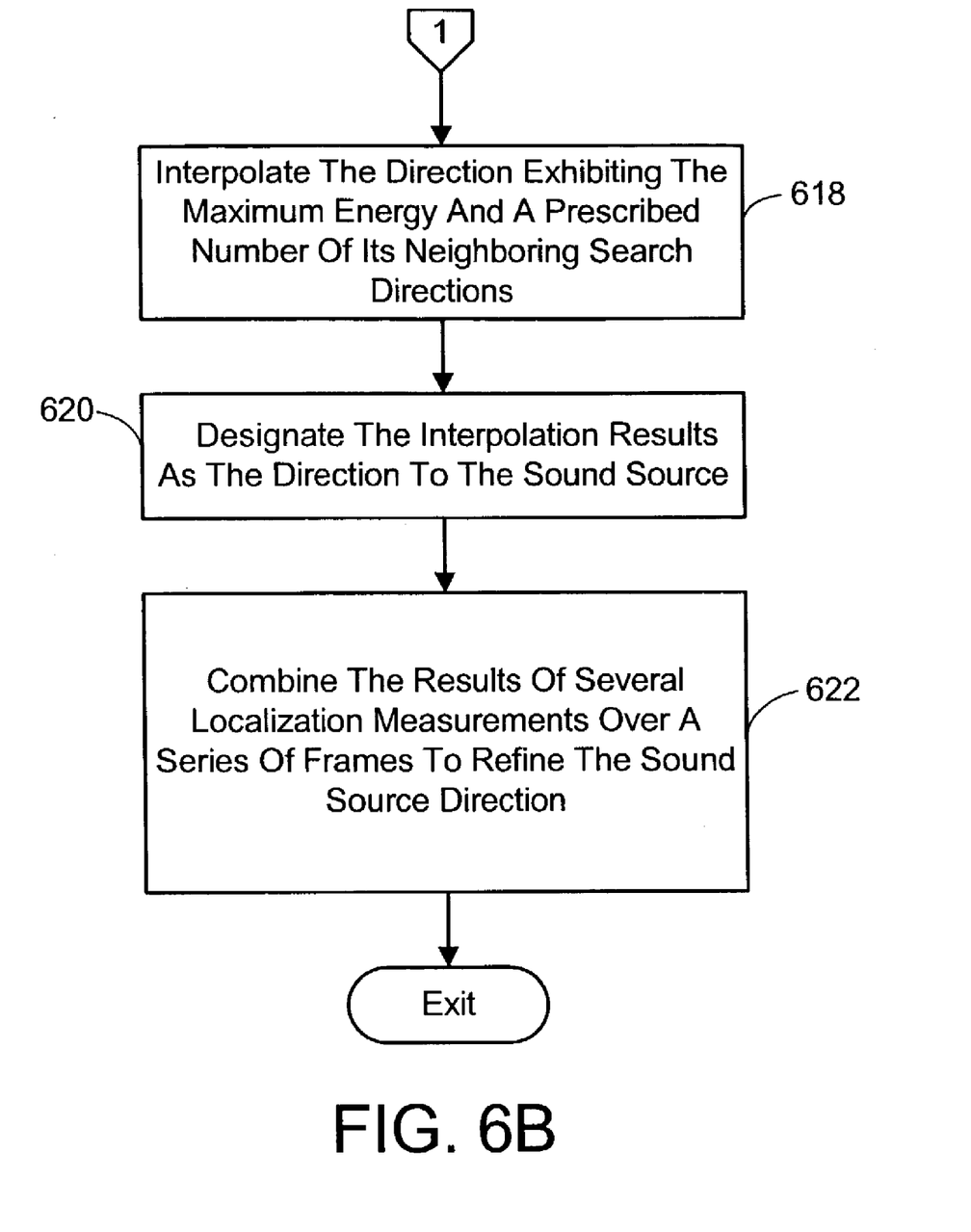

The SSL process according to the present invention will now be described in the context of the teleconferencing application example detailed above. Referring to FIGS. 6A and B, the process begins with a pre-processing of the signal from each of the microphone array sensors that are to be employed in the SSL process. More particularly, for each microphone signal, the signal is first packaged into frames (process action 600). The frames representing the earliest captured frame of each microphone signal, which have not been previously processed, are selected (process action 602). In this way, the frames are process in the sequence they were captured. The selected frame set is subjected to a noise suppression procedure (process action 604). Any conventional noise suppression technique can be employed with the goal being to reduce the ambient noise in the signal frames to as great an extent as possible. Next, the frame set is classified to decide if it exhibits evidence of a significant sound source. Essentially this is accomplished using energy as the basis for the decision. If it is found the frame set has sufficient evidence of sound source content, it is processed further. If not, the frame set is ignored and the next frame set of the array signals is processed from the beginning. More particularly, in process action 606, the energy exhibited by the frame set under consideration is calculated. This energy value will be used for both noise floor tracking and frame classification. There are many methods available for classifying an audio frame and any appropriate technique can be employed. However, in the example, the noise floor is tracked using a standard first order integrator with separate time constants for going up slowly and down much faster. Thus, in process action 608, the noise floor associated with the current frames under consideration is computed. Frames with an energy level less than a prescribed multiple of the noise floor are rejected and not used for SSL computations. More particularly, it is determined in process action 610 if the energy computed for the current frame set exceeds a value equal to the prescribed multiple of the current noise floor value. If not, then the current frame set is rejected and the next frame set in the sequence is processed by repeating actions 602 through 610. If the current frame set passes the minimum energy threshold test described above, then it is subjected to the beamsteering procedure. This involves computing the full spectrum energy for each of a prescribed number of directions using Eq. (8) (process action 612). In this example, the energy in 32 evenly distributed angles about the center of the microphone array is computed assuming the aforementioned 15 degree pitch angle and a 360 degree work zone. Each of the energy values computed for each direction is weighted by multiplying it by the aforementioned weight function S(f).

After finding the energy as function of the direction angle, a last check is made before determining the direction to the sound source. There should be enough difference between the minimal and maximal weighted energy values to indicate there is a well defined sound source and not just ambient noise. Otherwise the frame set is rejected. Specifically, the maximum weighted energy value is identified, as is the minimum energy value (process action 614). The criterion used to reject the audio frame is:

$$\frac{E_{max} - E_{min}}{E_{average}} < C \quad (13)$$

where $E_{max}$, $E_{min}$ and $E_{average}$ are the maximal, minimal and average energy of the search directions and C is a prescribed constant. In the present example implementation, C was set equal to 0.3. Accordingly, in process action 616, it is determined if C in Eq. (13) is exceeded or not. If it is not exceeded, the frame set is rejected and the process begins again with the next frame set by repeating actions 602 through 616. If it is exceeded, the process continues with an interpolation procedure. More particularly, the direction exhibiting the maximum energy and a prescribed number of its neighboring (i.e., adjacent search directions) are interpolated (process action 618) in the manner described previously. The result of the interpolation process is then designated as the direction identifying the location of the sound source (process action 620).

The process can then enter a post-processing phase if desired. Essentially, in post processing, the results of several localization measurements over a series of frame sets, can be combined (process action 622). This is done to increase the precision, to follow the sound source movements, or to track multiple sound sources. Techniques that can be used for this task include a simple averaging, or more complex techniques such as statistical processing, Kalman filtering, particle filtering [2], and the like.

5.0 References

[1] Ramani Duraiswami, Dmitry Zotkin, Larry Davis, "Active Speech Source Localization By A Dual Coarse-To-Fine Search". Proceedings ICASSP 2001, Salt Lake City, Utah, May 2001.

[2] Daren Ward, Robert Williamson. "Particle filter beamforming for acoustic source localization in a reverberant environment". ICASSP 2002, Orlando, Fla., May 2002.

Wherefore, what is claimed is:

1. A system for finding the direction to a sound source from a microphone array in a prescribed search area, comprising:
   a microphone array having a plurality of audio sensors;
   a general purpose computing device;
   a computer-readable medium having computer-executable instructions, wherein the computing device is directed by the instructions of the computer-readable medium to,
   (a) package the signals produced by the array microphones into frames,
   (b) select the frames representing the earliest captured frame of each microphone signal which have not been previously processed,
   (c) subject the selected frames to a noise suppression procedure,
   (d) classify the frames based on whether they exhibit evidence of a significant sound source,
   (e) whenever it is found that the frames do not exhibit evidence of a significant sound source, repeat program modules (b) through (e) as appropriate,
   (f) whenever it is found that the frames do exhibit evidence of a significant sound source,
   compute a full spectrum energy comprising an energy value for each of a prescribed set of audio frequency sub-bands within an overall frequency band for a beam in each of a prescribed number of directions, wherein a beam represents a region surrounding a direction extending away from the microphone array wherein sounds originating within that region remain unaffected, while sounds originating outside that region are suppressed, and wherein the prescribed number of directions represent a set of search directions extending away from the microphone array which when a beam is associated with each of the search directions covers the entire search area without significant overlap between adjacent beams extending along those directions, and
   for each computed energy value, apply a weighting factor associated with the frequency sub-band of the computed energy value, from a set of weighting factors comprising one for each of said set of audio frequency sub-bands, to the computed energy value, wherein each weighting factor reflects an energy level which is expected to be exhibited by the sound source at the frequency sub-band associated with the weighting factor relative to all the other sub-bands within the overall frequency band,
   (g) identify the search direction exhibiting the maximum energy across the overall frequency band, and
   (h) designate the maximum energy direction as the direction to the sound source.

2. The system of claim 1, wherein the program module for classifying the frames based on whether they exhibit evidence of a significant sound source, comprises sub-modules for:

computing the overall energy exhibited by the currently selected frames;

computing the noise floor energy value associated with the selected frames;

determining whether the overall energy exceeds a prescribed multiple of the noise floor energy value;

whenever the overall energy does not exceed the prescribed multiple of the noise floor energy value, designating that the currently selected frames do not exhibit evidence of a significant sound source; and whenever the overall energy does exceed the prescribed multiple of the noise floor energy value, designating that the currently selected frames do exhibit evidence of a significant sound source.

3. The system of claim 1, wherein the region associated with each beam that remains unaffected while sounds originating outside that region are suppressed has the same size and shape as the other beams, and wherein the search directions associated with the beams represent evenly distributed angles about a center of the microphone array and wherein the number of beams employed represents the minimum number of beams possible while still covering the entire search area.

4. The system of claim 1, wherein the sound source is a human voice, and wherein a graph of the set of weighting factors, each of which ranges between 0 and 1, plotted against the set of audio frequency sub-bands represents a bell shaped curve with a maximum at about 1000 Hz and limits at about 500 and 1500 Hz.

5. The system of claim 1, wherein each weighting factor S(f) is defined as $$S(f) = \begin{cases} 0.5 + 0.5 \cos\left(\frac{2\pi(f-1000)}{1000}\right) & \text{for } f \text{ between about } 500 \text{ and } 1500 \text{ Hz} \\ 0 & \text{otherwise} \end{cases}$$

wherein f is the frequency associated with the weighting factor sub-band.

6. The system of claim 1, wherein the program module for identifying the search direction exhibiting the maximum energy, comprises sub-modules for:

identifying the greatest weighted energy value computed for a beam;

identifying the smallest weighted energy value computed for a beam;

determining if there is at least a prescribed energy difference between the greatest and smallest weighted energy values;

repeating program modules (b) through (h) as appropriate, whenever it is found that the difference between the greatest and smallest weighted energy values does not exceed the prescribed energy difference; and designating the search direction exhibiting the maximum energy as being the search direction associated with the beam identified as having the greatest weighted energy, whenever it is found that the difference between the greatest and smallest weighted energy values does exceed the prescribed energy difference.

7. The system of claim 6, wherein the sub-module for determining if there is at least the prescribed energy difference between the greatest and smallest weighted energy values, comprises sub-modules for:

computing the average weighted energy of all the beams;

computing the difference between the greatest and smallest weighted energy values and dividing said difference by the average weighted energy to produce an energy ratio;

determining if the energy ratio is less than a prescribed constant representing the minimum allowed energy difference;

designating that there is at least the prescribed energy difference between the greatest and smallest weighted energy values if it is determined the energy ratio equals or exceeds the prescribed constant; and designating that there is not at least the prescribed energy difference between the greatest and smallest weighted energy values if it is determined the energy ratio is less than the prescribed constant.

8. The system of claim 7, wherein the prescribed constant is about 0.3.

9. The system of claim 8, wherein the program module for designating the maximum energy direction as the direction to the sound source comprises a sub-module for interpolating between the search direction exhibiting the maximum energy and two or more adjacent search directions to refine the direction from the microphone array that represents the sound source direction.

10. The system of claim 9, wherein the sub-module for interpolating between the search direction exhibiting the maximum energy and two or more adjacent search directions to refine the direction from the microphone array that represents the sound source direction, comprises sub-modules for:

characterizing the search direction exhibiting the maximum energy and said two or more adjacent search directions as an approximation surface which can be defined as a polynomial having an order equal to the number of neighboring search directions, such that for each search direction considered, the energy associated with that direction is set equal to a set of unknown coefficients and that direction in polynomial form thereby creating a linear system of equations equaling the number of unknown coefficients;

solving the linear system of equations to determine the unknown coefficients;

estimating a maximum of the approximation surface as the direction associated with a zero of the first derivative of said polynomial equation; and designating the direction associated with the estimated approximation surface maximum as the sound source direction.

11. The system of claim 1, comprising a program module for refining the sound source direction by respectively combining the sound source direction computed over a series of frame sets.

12. The system of claim 11, wherein the program module for refining the sound source direction by respectively combining the sound source direction computed over a series of frame sets, comprises one of (i) averaging said sound source directions, (ii) subjecting the sound source directions to a Kalman filtering procedure, or (iii) subjecting the sound source directions to a particle filtering procedure.

13. A computer-readable medium having computer-executable instructions; for finding the direction to a sound source from a microphone array in a prescribed search area using a beamsteering approach, said computer-executable instructions comprising using a computer to perform the following process actions:

determining the minimum number of beams it would take to cover the entire search area without significant overlap;

establishing a set of search directions extending away from the microphone array which equal said minimum number of beams and which are spaced equally from each other in such a way as to cover the entire search area while preventing any significant overlap between adjacent beams extending along those directions;

estimating the audio energy within the beams associated with each of the set of search directions, said estimation comprising computing an energy estimate as $$E_{est}(d_l) = \int_0^{\frac{f_s}{2}} E_{est}(d_l, f) S(f) df,$$

wherein $f_s$ is a prescribed sampling frequency, $d_l$ is a search direction, f belongs to a prescribed set of audio frequencies and S(f) is a weight function associated with frequency f, and wherein S(f) ranges between 0 and 1 and reflects an energy level at frequency f which is expected to be exhibited by the sound source relative to all the other frequencies within said set of audio frequencies;

identifying the search direction exhibiting the maximum energy;

designating the maximum energy direction as the direction to the sound source.

14. The computer-readable medium of claim 13, further comprising an instruction for segmenting the signals produced by the array microphones into sets of contemporaneously captured frames prior to performing the computing, identifying and designating process actions, and wherein the computing, identifying and designating process actions are performed on a frame set-by-frame set basis.

15. The process of claim 14, further comprising the process actions of:

identifying for each frame set whether it exhibits evidence of a significant sound source related to the type of sound being sought; and eliminating any frame set that is deemed to lack evidence of said significant sound source from consideration prior to performing the computing, identifying and designating process actions.

16. The process of claim 13, wherein all directions are measured in spherical coordinates comprising pitch and yaw angles from an origin at the microphone array.

17. The process of claim 16, wherein the prescribed search area comprises a hemisphere.

18. The process of claim 16, wherein the pitch angle is fixed and the prescribed search area comprises a 360 degree excursion of the yaw angle.

19. The process of claim 16, wherein the pitch angle is fixed and the prescribed search area comprises less than a 360 degree excursion of the yaw angle.

20. The process of claim 13, wherein each beam has the same size and shape.

21. A computer-readable medium having computer-executable instructions for finding the direction to a sound source from a microphone array in a prescribed search area, said computer-executable instructions comprising:

determining the minimum number of beams it will take to cover the entire search area without significant overlap, wherein a beam represents a region surrounding a direction extending away from the microphone array wherein sound originating within that region remain unaffected, while sounds originating outside that region are suppressed;

establishing a set of search directions extending away from the microphone array which equal the minimum number of beams and which are spaced equally from each other in such a way as to prevent any significant overlap between adjacent beams extending along those directions;

estimating the audio energy within the beams associated with each of the set of search directions, said estimation comprising computing an energy estimate as $$E_{est}(d_l) = \int_0^{\frac{f_s}{2}} E_{est}(d_l, f) S(f) df,$$

wherein $f_s$ is a prescribed sampling frequency, $d_l$ is a search direction, f belongs to a prescribed set of audio frequencies and S(f) is a weight function associated with frequency f, and wherein S(f) ranges between 0 and 1 and reflects an energy level at frequency f which is expected to be exhibited by the sound source relative to all the other frequencies within said set of audio frequencies;

identifying the search direction exhibiting the maximum energy; and designating the maximum energy direction as the direction to the sound source.

* * * * *